Figure 4:
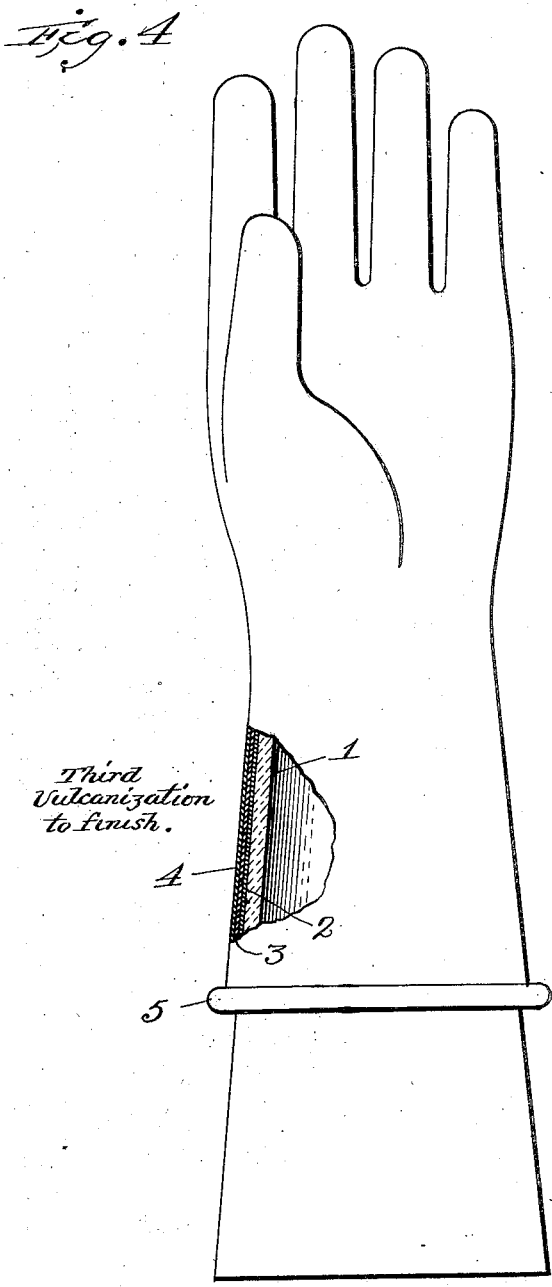

T. W. MILLER.
MANUFACTURE OF SEAMLESS RUBBER ARTICLES.
APPLICATION FILED APR. 30, 1915.

1,152,372.

Patented Aug. 31, 1915.

Third Vulcanization to finish.

Dipped and Vulcanized

Second Dipping and Vulcanized

Third Dipping and Bottom Edge Rolled Before Vulcanizing.

Witness
Edwin L. Yewell

Inventor
Thomas W. Miller
Percy B. Hills
Attorney

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

MANUFACTURE OF SEAMLESS RUBBER ARTICLES.

1,152,372.      Specification of Letters Patent.      Patented Aug. 31, 1915.

Application filed April 30, 1915. Serial No. 24,997.

*To all whom it may concern:*

Be it known that I, THOMAS W. MILLER, a citizen of the United States, residing at Ashland, in the county of Ashland and State of Ohio, have invented certain new and useful Improvements in Manufacture of Seamless Rubber Articles, of which the following is a specification.

My invention relates to the manufacture of seamless rubber articles, such as gloves, nipples, finger cots, tobacco pouches, and the like, by what is known as the dipping process, and has for its object to provide an article of this character, which shall be homogeneously cured or vulcanized, whereby a thoroughly satisfactory article of this character will be produced. In the manufacture of these articles, the same are built up on a proper form by repeated dippings in a solution of rubber, whereby successive coats of rubber are deposited upon the form to produce the article of the required thickness. It is the practice in curing or vulcanizing these articles to do so while still on the form and to cure them either by what is known as the acid cure or by the vapor cure, in both of which the sulfur necessary for the chemical change is in the liquid or vapor to which the articles are subjected, as distinguished from being in the rubber. Now, while these forms of cure for dipped rubber goods are preferable in most respects to a steam cure, still they present the defect that it is practically impossible to cure an article of any thickness homogeneously. That is to say both the acid and vapor cures penetrate from the outside inward, and where the article to be cured is much thicker than one thirty-second of an inch there is great liability of burning or overcuring the surface of the article if the cure is persisted in long enough to thoroughly penetrate the inner surface. Applicant overcomes this difficulty by a novel process of manufacture, which consists in subjecting the form to one or more dippings in the rubber solution, whereby there will be deposited upon said form a portion only of the article to be formed. This deposit is then vulcanized in the usual manner by the acid or vapor process, and being very thin, a complete and thorough vulcanization may be effected very readily. The form carrying this vulcanized material is then again dipped into the rubber solution one or more times to effect a further deposit overlying the first vulcanized deposit. This article then is again vulcanized by the acid or vapor process, which results in a thorough vulcanization of the last applied layer, without affecting the first applied layer. Assuming that these two layers do not produce an article of the desired thickness, a third dipping or series of dippings is now resorted to and produce a third layer of rubber upon the article on the form, and if it is desired to give a rolled finish at the edge, the latter is rolled up to form the usual bead, and the article as a whole is then again vulcanized by the acid or vapor process, whereby the outer layer last applied is thoroughly vulcanized, the result being to produce an article of any desired thickness, which is homogeneously vulcanized throughout by the acid or vapor process.

In order more thoroughly to disclose my invention, I have illustrated the same in the accompanying drawing, in which:—

Figure 1:
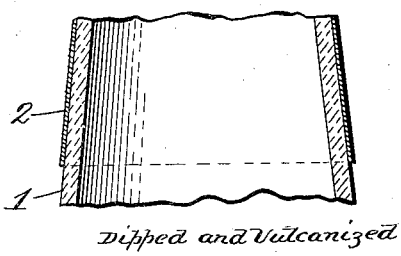
Figure 2:
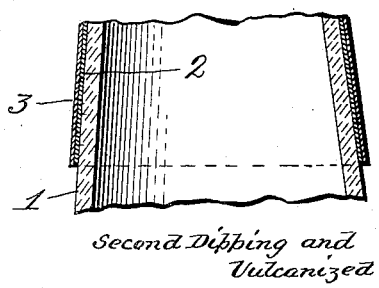
Figure 3:
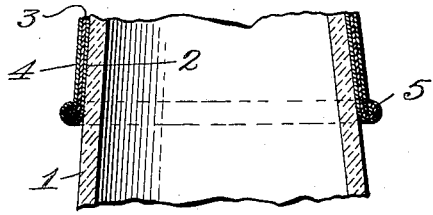
Figure 5:
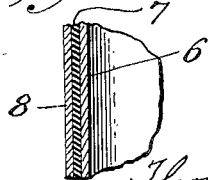

Figure 1 is a fragmentary sectional view of a form having shown thereon the primary layer of the article dipped and vulcanized. Fig. 2 is a similar view showing the article after its second dipping and vulcanization. Fig. 3 is a similar view showing the article after the third dipping, and with the edge rolled up to form the bead, and before vulcanization. Fig. 4 is an elevation partly broken away of a complete glove form, showing a completed glove thereon. Fig. 5 is a detail sectional view of a portion of an article illustrating a slight modification.

In the said drawing, the reference numeral 1 denotes the form, in this case a glove form, which may be formed of porcelain or other suitable material, and which is used in the conventional manner for applying thereto the rubber to form the glove. In operating by my improved process, however, the form 1 is dipped one or more times to form a primary layer 2 of rubber, which shall not be much over one sixty-fourth of an inch thick. This layer of rubber while still on the form is subjected to the curing process hereinbefore described, where it will be, on account of its thinness, cured homogeneously and without danger of burning the outer surface. The form with this cured layer 2 is again dipped one or more times into the rubber solution to deposit thereon the rubber layer 3, and the article so formed is again subjected to the curing process, whereby this outer layer 3 is most thoroughly cured without affecting the inner layer 2. It is usual in the manufacture of gloves to form the article in three layers, and accordingly the form 1 carrying the two layers 2 and 3 is again dipped to produce thereon the outer layer 4. Where it is desired to form the bead 5 on the glove or other article, the material is rolled up, the outer sticky layer 4 providing the necessary adhesion to retain the roll until the glove again can be subjected to the curing action of acid or vapor bath. After this final cure, the completed glove is stripped from the form and will be found to be cured homogeneously and in a most thorough and efficient manner.

It will be understood that instead of rolling the edge of the article at 5, as is common with gloves, nipples, finger cots, and the like, a finishing strip may be applied to the mold 1 before the first dipping, which will be incorporated with the end of the glove in the usual well known manner.

While I have described a series of three separately vulcanized layers to form the glove illustrated, it will be understood that I contemplate any number of layers that may be desirable to form the article sought. Thus in the formation of nursing nipples, it has been found in practice that the same can be formed in two layers, which will give a sufficient thickness.

I am aware that it is not new to coat a completely formed and vulcanized rubber article, such as a ball or a nursing nipple, with a veneer of rubber to give the same a finish, the article so coated being again vulcanized. But my present invention clearly distinguishes from such prior use, in that the successive dippings and vulcanizations are carried on while the article is in the process of being built up, as distinguished from a mere veneering of an otherwise completed article.

In the manufacture of some rubber articles, I also find it desirable to form the different layers of different consistencies of rubber. Thus, where three layers are made, the outer layers may be of a rubber composition, and the intermediate layer of pure Pará rubber. Or the consistencies of rubber may be varied in any desired manner. In Fig. 5, I have shown a sectional view of an article illustrating this idea, the inner layer being shown at 6, the intermediate layer at 7 and the outer layer at 8.

Having thus described my invention, what I claim as new and desire to secure by Letters Patent, is:—

1. The process of forming rubber articles, which consists in depositing the rubber on a form in successive layers, and curing or vulcanizing said layers separately.

2. The process of forming dipped rubber articles, which consists, first, in depositing upon a form by dipping a layer of rubber constituting a partial thickness only of the completed article, then curing or vulcanizing said layer while still on the form, and repeating said layer formation and vulcanizing until the completed article is formed.

3. The process of forming rubber articles, which consists in depositing the rubber on a form in successive layers, and curing or vulcanizing said layers separately through means carrying the sulfur.

4. The process of forming dipped rubber articles, which consists, first, in depositing upon a form by dipping a layer of rubber constituting a partial thickness only of the completed article, then curing or vulcanizing said layer while still on the form, and repeating said layer formation and vulcanizing until the completed article is formed, the curing or vulcanizing means carrying the sulfur.

5. The process of forming rubber articles, which consists in depositing the rubber on a form in successive layers, curing or vulcanizing said layers separately, and after the last layer deposit, but before its vulcanization, rolling the layers into a bead for the open end of the article.

6. The process of forming rubber articles, which consists in depositing the rubber on a form in successive layers, said rubber being of different consistencies, and curing or vulcanizing said layers separately.

7. A dipped rubber article formed of separate layers of rubber, said layers being successively vulcanized after being deposited.

8. A dipped rubber article formed of separate layers of rubber, said layers being successively vulcanized after being deposited, said vulcanization being effected by means carrying the sulfur.

9. A dipped rubber article consisting of a series of layers separately vulcanized, said layers being of different consistencies of rubber.

In testimony whereof I have hereunto set my hand this 27" day of April, 1915.

THOMAS W. MILLER.